United States Patent [19]

Nasu et al.

[11] Patent Number: 4,706,192

[45] Date of Patent: Nov. 10, 1987

[54] INPUT APPARATUS FOR ENTERING BASE SEQUENCE INFORMATION OF THE GENE

[75] Inventors: Hisanori Nasu; Satoru Suzuki, both of Yokohama; Hiroaki Yoshida, Tokyo; Tomoichi Fukuda, Tenryu; Eiichi Soeda, Mishima, all of Japan

[73] Assignee: Hitachi Software Engineering Co., Ltd., Tokyo, Japan

[21] Appl. No.: 727,762

[22] Filed: Apr. 26, 1985

[30] Foreign Application Priority Data

Apr. 27, 1984 [JP] Japan .................................. 59-85929
Mar. 13, 1985 [JP] Japan .................................. 60-26025

[51] Int. Cl.$^4$ ............................................. G06F 15/42
[52] U.S. Cl. ........................................ 364/413; 382/6; 358/93
[58] Field of Search ........................... 364/413; 382/6; 358/107, 93

[56] References Cited

U.S. PATENT DOCUMENTS

3,833,796  9/1974  Fetner .................................. 364/413
4,016,540  4/1977  Hyatt .................................. 364/900
4,592,089  5/1986  Hartman .................................. 358/93

OTHER PUBLICATIONS

Patents Abstracts of Japan, vol. 7, No. 216 (P-225)(1361) 9/24/83; & JP-A-58 109 921.
Computer Design, vol. 21, No. 8, Aug. 1982, pp. 64, 66, Winchester, Mass. U.S.; D. Eidsmore: "Synthesizer Converts ASCII Data on IEEE 488 Bus to Speech".
IBM Technical Disclosure Bulletin, vol. 24, No. 7A, Dec. 1981, p. 3292 Armonk, N.Y. U.S.; JC Askew et al., "Magnetic Stripe Reader with Audio Confirmation".

*Primary Examiner*—Jerry Smith
*Assistant Examiner*—Gail O. Hayes
*Attorney, Agent, or Firm*—M. N. Meller

[57] ABSTRACT

An input apparatus for entering base sequence information of the gene, comprises a computer for analyzing the base sequence of the gene, an input apparatus for entering base sequence information of the gene to the computer which successively stores the base sequence information entered by the input apparatus and produces the stored base sequence information, and a speech sounding apparatus supplied with the base sequence information produced from the computer for sounding speech corresponding to the base sequence information produced from the computer.

4 Claims, 10 Drawing Figures

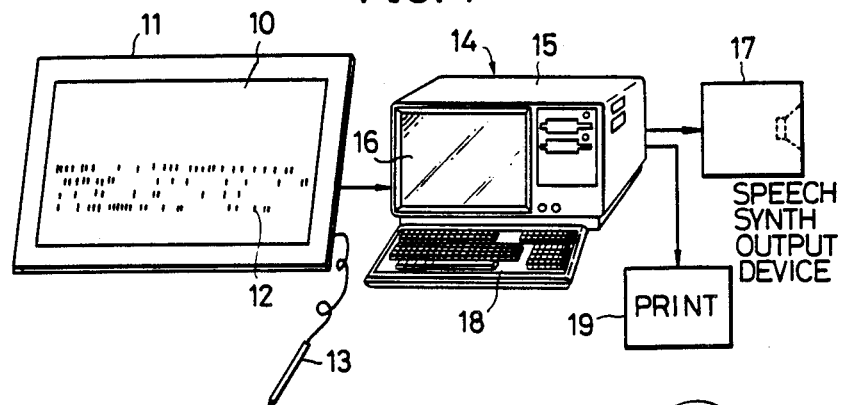
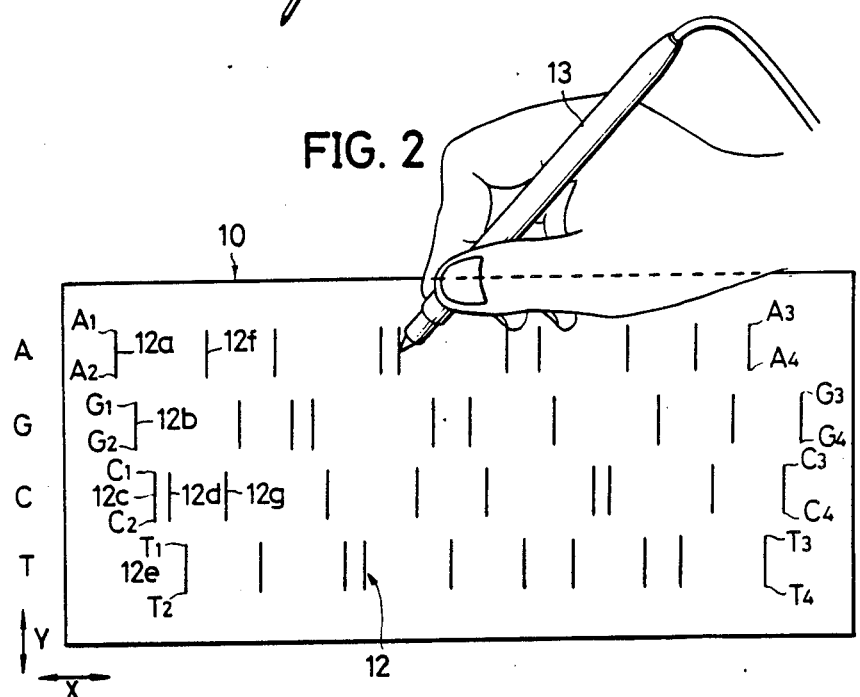
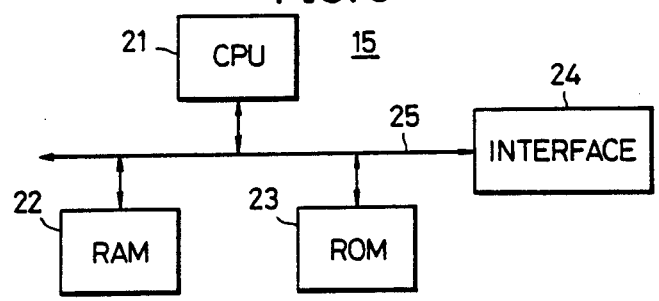

FIG. 4
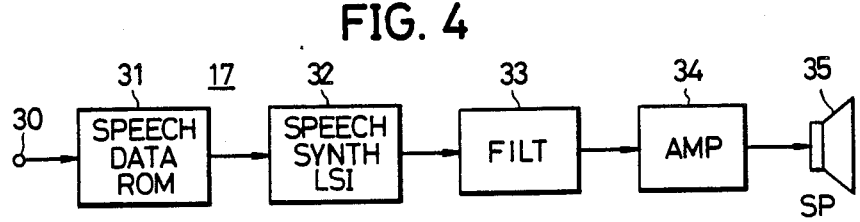
FIG. 6
| BASE CODE | COORDINATE |
|---|---|
| A | $A_1(X_1\ Y_1), A_2(X_2\ Y_2), A_3(X_3\ Y_3), A_4(X_4\ Y_4)$ |
| G | $G_1(X_5\ Y_5), G_2(X_6\ Y_6), G_3(X_7\ Y_7), G_4(X_8\ Y_8)$ |
| C | $C_1(X_9\ Y_9), C_2(X_{10}\ Y_{10}), C_3(X_{11}\ Y_{11}), C_4(X_{12}\ Y_{12})$ |
| T | $T_1(X_{13}\ Y_{13}), T_2(X_{14}\ Y_{14}), T_3(X_{15}\ Y_{15}), T_4(X_{16}\ Y_{16})$ |
FIG. 7
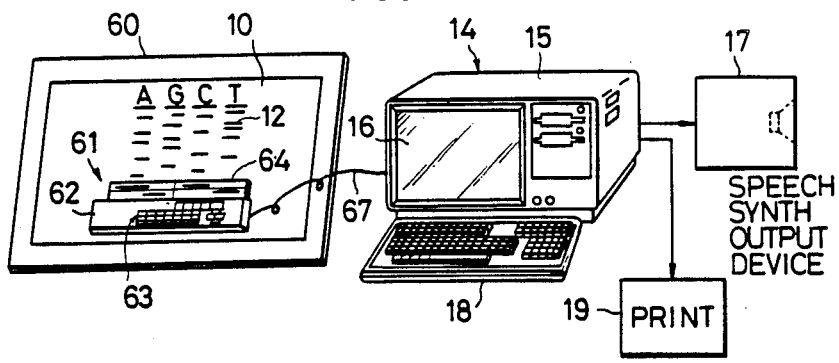

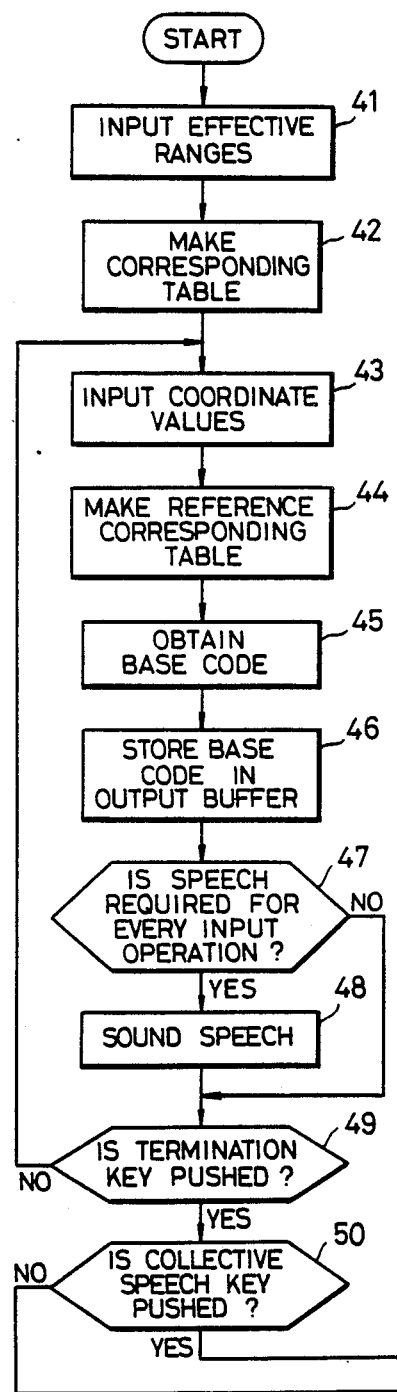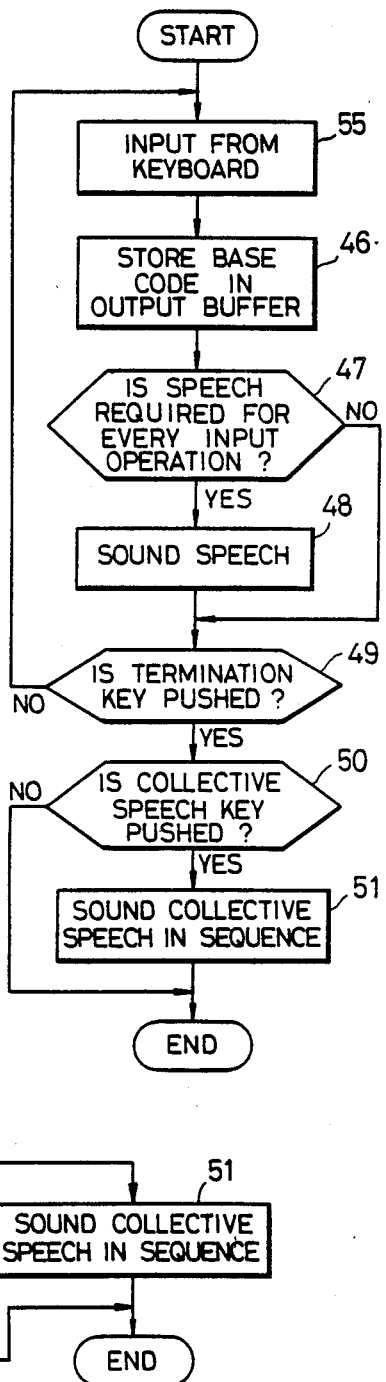

INPUT APPARATUS FOR ENTERING BASE SEQUENCE INFORMATION OF THE GENE

BACKGROUND OF THE INVENTION

The present invention generally relates to input apparatuses for entering base sequence information of the gene, and more particularly to an input apparatus which facilitates the confirmation of the input information entered into a computer when entering into the computer the base sequence information of the gene imaged on a film by X-ray photography.

It is generally known that the gene of an organism is made up of deoxyribonucleic acid (DNA) in which four kinds of organic bases are arranged in a double helix structure. The four kinds of bases are adenine (A), guanine (G), cytosine (C), and thymine (T). As a method of determining the base sequence of the DNA, there is a method called the Maxam-Gilbert method. According to the Maxam-Gilbert method, the DNA chain is broken by a reagent which chemically separates each of the bases, and the bases are arranged according to the difference in the lengths thereof by the electrophoresis method to image the bases on the film by X-ray photography. Bands of the bases A, G, C, and T are arranged on the film which is obtained by the X-ray photography, and it is possible to analyze the gene by analyzing the base sequence on the film.

In order to perform the base sequence analysis, the base sequence information (hereinafter simply referred to as base code) on the film is entered into a computer. As an input apparatus for entering the base code into the computer, there is a conventional input apparatus which uses a digitizer. The X-ray film is placed on the digitizer, and the bands on the film are successively traced by a pen or a cursor so as to enter the output signal of the digitizer into the computer. According to this type of an input apparatus, it is necessary to trace the band by the pen or cursor and then confirm whether the base code is correctly entered into the computer. Such a confirming operation is required because an operational error may occur even when the bands on the film are clearly visible. Especially in a case where the bands on the film are curved (when the so-called smiling occurs), it is difficult to determine the relationship between upper and lower ends (front and rear ends) of the different bands, and an operational error is likely to occur in such a case when entering the base code into the computer. In addition, in a case where the precision of the film is high and the bands are concentrated on the film, it is difficult to correctly determine the number of bands at parts on the film where the bands appear virtually overlapped, and an operational error is even more likely to occur in this case.

For this reason, the base codes which are entered into the computer are conventionally displayed on a display or are printed on a printer to confirm the entered base codes, which display and printer are provided additionally to the computer.

However, according to the conventional apparatus which visually confirms the base code entered into the computer by displaying the base codes on the display, it is necessary to confirm whether the base code is correctly entered into the computer by monitoring the display every time the input operation is performed to enter the base code into the computer from the digitizer. Hence, the operator must alternately shift his line of vision between the digitizer and the display, and the operation efficiency of the input operation is poor because of the poor confirmation efficiency. Further, there is a disadvantage in that the operator will easily suffer eyestrain.

On the other hand, according to the conventional apparatus which prints the base codes entered into the computer by the printer, the base codes are printed after all or a predetermined large number of base codes are entered into the computer. The confirmation of whether the base codes are correctly entered is performed by visually comparing and checking the base codes on the film and the data on a printed paper. Thus, it takes a long time to complete the confirming operation. Moreover, it is impossible to notice an error immediately after the error is made during the input operation performed with respect to a base code, because the base code entered into the computer is only printed after all or the predetermined large number of base codes are entered into the comupter. Therefore, there are disadvantages in that the confirmation efficiency and the correcting efficiency are poor.

SUMMARY OF THE INVENTION

Accordingly, it is a general object of the present invention to provide a novel and useful input apparatus for entering base sequence information of the gene, in which the disadvantages described heretofore are eliminated.

Another and more specific object of the present invention is to provide an input apparatus for entering base sequence information of the gene, in which a base information entered into a computer is confirmed by sounding of speech. According to the input apparatus of the present invention, the operator can confirm by his ear a base code which is entered into the computer every time a band of a base code on a film is entered into the computer, and/or confirm by his ear the base codes which are entered into the computer after the input operation is completed for all of the bands of the base codes on the film. For this reason, there is no need for the operator to alternately shift his line of vision between the film and a display as in the conventional apparatus described before, and it is possible to easily confirm whether the base codes are correctly entered into the computer. According to the input apparatus of the present invention, the operation efficiency of the input operation is improved by two to three times compared to the operation efficiency of the conventional apparatus. In addition, the confirmation efficiency is improved by ten to fifteen times compared to the conventional apparatus described before which performs the confirmation by visually comparing and checking the bands of the base codes on the film with data which are printed on a printed paper.

Still another object of the present invention is to provide an input apparatus for entering base sequence information of the gene, which comprises a slide keyboard device provided with keys and a scale. The input apparatus of the present invention is designed to enter the base codes into the computer by visually identifying each band on the film and pushing a key corresponding to the identified band. According to the input apparatus of the present invention, it is unnecessary to use an expensive digitizer as in the conventional apparatus. Further, the construction of the input apparatus is simple, and the reliability of the input apparatus is superior. Because the keys are disposed close to the scale, the operator can perform the input operation, that is, push the keys, without shifting his line of vision from the film. Especially in a case where the scale employs a magnifying glass, it is possible to positively identify the bands even when the bands are curved (smiling) or are concentrated on the film. Therefore, the operation efficiency of the input operation is improved by two to three times compared to the operation efficiency of the conventional apparatus.

Other objects and further features of the present invention will be apparent from the following detailed description when read in conjunction with the accompanying drawings.

BRIEF DESCRIPTION OF THE DRAWINGS

FIG. 1 is a general system diagram showing a first embodiment of the input apparatus according to the present invention for entering base sequence information of the gene;

FIG. 2 shows an example of a film on which the base sequence of the gene is imaged thereon as bands;

FIG. 3 is a system block diagram showing an embodiment of a main computer body shown in FIG. 1;

FIG. 4 is a system block diagram showing an embodiment of a speech synthesis output apparatus shown in FIG. 1;

FIG. 5A is a flow chart for explaining the operation of the input apparatus shown in FIG. 1 in a case where an input operation is performed by use of a digitizer;

FIG. 5B is a flow chart for explaining the operation of the input apparatus shown in FIG. 1 in a case where the input operation is performed by use of a keyboard;

FIG. 6 shows an example of a corresponding table of base codes and effective ranges of bands;

FIG. 7 is a general system diagram showing a second embodiment of the input apparatus according to the present invention for entering base sequence information of the gene;

DETAILED DESCRIPTION

Figure 8:
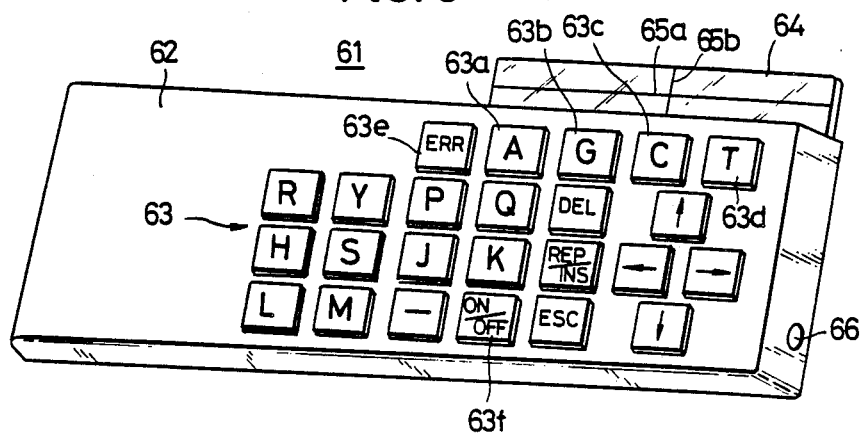
FIG. 8 is a perspective view showing a handy type keyboard shown in FIG. 7.

First, a description will be given with respect to a first embodiment of the input apparatus according to the present invention for entering base sequence information of the gene, by referring to FIG. 1. An X-ray film 10 having the base sequence of the gene imaged thereof by X-ray photography, is placed on a digitizer 11. As shown in FIG. 2, bands 12 indicated by thick solid lines are imaged on the film 10, which bands 12 correspond to the four kinds of base codes A, G, C, and T having the sequence thereof determined according to the Maxam-Gilbert method.

The digitizer 11 is coupled to a computer 14. When entering the base code into the computer 14, the operator holds a pen 13 provided on the digitizer 11 and traces the band 12 with the pen 13 as shown in FIG. 2. The pen 13 has a built-in electromagnetic coil. An A.C. current flows through the coil of the pen 13. Accordingly, an electromotive force proportional to the mutual inductance is generated in a sense loop located at a position corresponding to the position traced by the pen 13. The coordinate value of the position traced by the pen 13 is detected by detecting the electromotive force. The coordinate value is converted into a digital signal in an analog-to-digital (A/D) converter within the digitizer 11 and is supplied to a main computer body 15 of the computer 14. A detailed description on the digitizer 11 will be omitted because the digitizer 11 itself is known.

In the example illustrated in FIG. 2, the operator traces bands 12a, 12b, 12c, . . . among the bands 12 in this sequence by the pen 13 and successively enters the coordinate values into the computer 14. The main computer body 15 converts the input coordinate values into the base codes based on band effective ranges corresponding to the base codes A, G, C, and T, which band effective ranges are determined in advance as will be described later on in the specification. The main computer body 15 supplies the base codes obtained by the conversion to a display apparatus 16 so as to display the base codes on the display apparatus 16 according to the needs. The main computer body 15 also supplies the base codes to a speech synthesis output apparatus 17.

The speech synthesis output apparatus 17 sounds speech "A", "G", "C", and "T" through a speaker responsive to the input base codes A, B, C, and T. Thus, the operator can confirm by his ear the base code of the band which is traced by the pen 13, at the same time as when he is entering the base code into the main computer body 15. Accordingly, the operator does not need to alternately shift his line of vision between the film 10 and the screen of the display apparatus 16 when he is entering the base code into the main computer body 15, and the operation efficiency of the input operation is greatly improved compared to the conventional apparatus.

Various function commands and the like are made with respect to the main computer body 15 by use of a keyboard 18. It is also possible to print out the input base code data by a printer 19 according to the needs. Instead of entering the base codes into the main computer body 15 by use of the digitizer 11, it is also possible to enter the base codes by use of the keyboard 18 as will be described later on in the specification.

In addition to sounding the speech every time the base code is entered into the main computer body 15, the input apparatus is designed to sound speech collectively in sequence. The main computer body 15 stores the base codes entered into the main computer body 15 and collectively supplies the stored base codes to the speech synthesis output apparatus 17 according to the needs, to sound speech collectively in sequence.

As shown in FIG. 3, the basic constitution of the main computer body 15 is the same as the microcomputer architecture. The main computer body 15 comprises a central processing unit (CPU) 21 for performing various processing operations, a random access memory (RAM) 22 for storing various data obtained during the processing operations, a read only memory (ROM) 23 which pre-stores programs, and an input/output (I/O) interface part 24. The CPU 21, the RAM 22, the ROM 23, and the I/O interface part 24 are coupled by way of a bus 25. The digitizer 11, the display apparatus 16, the speech synthesis output apparatus 17, the keyboard 18, and the printer 19 shown in FIG. 1 are coupled to the main computer body 15 by way of the I/O interface part 24.

An embodiment of the speech synthesis output apparatus 17 is shown in FIG. 4. The speech synthesis output apparatus 17 comprises a speech data ROM 31 which pre-stores speech data in accordance with the base codes and is supplied with the base codes from the main computer body 15 through a terminal 30, and a speech synthesis large scale integrated circuit (LSI) 32 for synthesizing speech by converting the speech data into an analog signal. The speech synthesis output apparatus 17 additionally comprises a filter 33, an amplifier 34, and a speaker 35 which are used for sounding speech. Speech data which are obtained by quantizing and digitizing analog electrical signals corresponding to the speech "A", "G", "C", and "T" are pre-stored in the speech data ROM 31 for each of the base codes A, G, C, and T at respective predetermined locations in the speech data ROM 31. When a base code is applied to the terminal 30 from the main computer body 15, the base code is assumed to be the starting address and speech data in a speech data group are successively read out from consecutive addresses of the speech data ROM 31. The speech data group read out from the speech data ROM 31 is converted into an analog audio signal in the speech synthesis LSI 32. The speech corresponding to the base code from the main computer body 15 is sounded from the speaker 35 by passing the output analog audio signal of the speech synthesis LSI 32 through the filter 33 and the amplifier 34. For example, a ROM 27128 manufactured by Nippon Electric Co., Ltd. of Japan may be used for the speech data ROM 31, and an LSI MSL5205 manufactured by Oki Electric Industry Co., Ltd. of Japan may be used for the speech synthesis LSI 32.

A description will now be given with respect to the processing operation of the main computer body 15 for the case where the digitizer 11 is used, by referring to the flow chart shown in FIG. 5A.

After the processing operation of the main computer body 15 is started, a step 41 enters the band effective ranges (the ranges in which the bands of the base codes to be entered exist) corresponding to the base codes A, G, C, and T imaged on the film 10. For example, the band effective range of the base code A is entered by entering the character "A" corresponding to the base code A by the keyboard 18 and then tracing the four corners A1, A2, A3, and A4 by the pen 13 as shown in FIG. 2. The four corners A1, A2, A3, and A4 indicate the coordinates of the effective range of the bands 12 of the base code A on the film 10 which is placed on the digitizer 11. The effective ranges of the bands 12 of the other base codes G, C, and T are entered similarly by tracing the respective corners G1 through G4, C1 through C4, and T1 through T4 by the pen 13. A step 42 makes a corresponding table between character data and the coordinate values of the band effective ranges of each of the base codes based on the input coordinate values, and stores the corresponding table in the RAM 22. FIG. 6 shows the contents of this corresponding table. The operations performed up to the step 42 are the operations performed before the base code sequence is entered into the main computer body 15.

Next, when the operator traces the bands 12 on the film 10 which is placed on the digitizer 11 by the pen 13 in the sequence of bands 12a, 12b, 12c, 12d, ..., a step 43 enters the coordinate values from the digitizer 11 into the main computer body 15. A step 44 makes reference to the corresponding table stored in the RAM 22 so as to determine the band effective range in which the input coordinate values fall and determine the base code to which the bands in the band effective range correspond. Based on the determination made in the step 44, a step 45 obtains the base code corresponding to the input coordinate values, and a step 46 stores the base code into an output provided within the RAM 22.

There are cases where it is desirable not to sound the speech every time the input operation is performed, but to collectively sound the speech in sequence after the input operation is completed. In such cases, the input apparatus is set to a mode in which it is unnecessary to sound the speech every time the input operation is performed, by manipulating the keyboard 18. For this reason, a step 47 discriminates whether the speech is required for every input operation. When the discrimination result in the step 47 is YES, a subsequent step 48 supplies the stored base code to the speech synthesis output apparatus 17. The speech synthesis output apparatus 17 synthesizes speech corresponding to the base code supplied thereto and sounds the speech. When it is unnecessary to sound the speech every time the input operation is performed, the discrimination result in the step 47 is NO, and the operation advances to a step 49.

Next, the main computer body 15 discriminates in the step 49 whether a termination key on the keyboard 18 is pushed. The operation returns to the step 43 when the discrimination result in the step 49 is NO. On the other hand, when the termination key is pushed and the discrimination result in the step 49 is YES, the operation advances to a step 50. The step 50 discriminates whether a collective speech key on the keyboard 18 is pushed in advance, and the discrimination result in the step 50 is NO when the collective speech key is pushed in advance. The operation is ended when the discrimination result in the step 50 is NO. When the collective speech key is pushed in advance, the discrimination result in the step 50 is YES, and a step 51 collectively reads out the contents stored in the output buffer within the RAM 22 in sequence, and supplies the read out contents to the speech synthesis output apparatus 17 which collectively sounds the speech in sequence.

In a case where the base codes to the entered into the main computer body 15 are known, the digitizer 11 is not used. In this case, the operator manipulates the keyboard 18 while reading the base codes written on a paper, for example, so as to enter the base codes into the main computer body 15. FIG. 5B is a flow chart for explaining the input operation for such a case.

After the processing operation of the main computer body 15 is started, a key of the keyboard 18 corresponding to one of the base codes A, G, C, and T is manipulated in a step 55 according to the base code to be entered into the main computer body 15. The step 46 stores into the output buffer within the RAM 22 the base code entered by the manipulation of the key of the keyboard 18. The operations performed after the step 46 are the same as those shown in FIG. 5A. In FIG. 5B, those steps which are the same as those corresponding steps shown in FIG. 5A are designated by the same reference numerals, and their description will be omitted.

The present invention is of course not limited to the embodiment described heretofore. For example, it is described in the embodiment described heretofore that each of the base codes is entered into the main computer body 15 by use of the keyboard 18 when entering the effective range of the bands imaged on the film 10 with respect to each of the base codes. However, four marks corresponding to the base codes A, G, C, and T may be provided on the digitizer, and each of the base codes may be entered into the main computer body 15 by tracing the marks by the cursor or pen.

Next, a description will be given with respect to a second embodiment of the input apparatus according to the present invention by referring to FIG. 7. In FIG. 7, those parts which are the same as those corresponding parts in FIG. 1 are designated by the same reference numerals, and their description will be omitted.

The film 10 having the base sequence of the gene imaged thereon by the X-ray photography, is placed on a light transmission type tracing board 60. A slide keyboard apparatus 61 for entering the base code during the input operation, has a handy type construction. The overall size of the slide keyboard apparatus 61 is compact like an electronic calculator, and is designed so that the slide keyboard apparatus 61 can be moved and manipulated with ease. As shown in FIG. 8, a plurality of keys 63 are arranged on the face of a main body 62 of the slide keyboard apparatus 61, and a scale 64 is provided on the upper part of the main body 62. The scale 64 is made from a transparent material, and has the shape of a magnifying glass so that the band 12 on the film 10 can be seen on an enlarged scale in its entirety. The scale 64 comprises reference lines 65a and 65b which intersect and are perpendicular to each other. A connector 66 is provided on the side of the main body 62, and the slide keyboard apparatus 61 is coupled to the main computer body 15 of the computer 14 by way of a cable 67.

Among the keys 63 of the slide keyboard apparatus 61, keys 63a through 63d identified by the letters "A", "G", "C", and "T" are used for entering the base codes. The keys 63a through 63d are disposed in the vicinity of the scale 64 so that the operator can easily manipulate the keys 63a through 63d while watching the bands 12 on the film 10 through the scale 64. A key 63e identified by the letters "ERR" is used to delete the base code data which is entered. A key 63f identified by the letters "ON/OFF" is pushed to assume the OFF state when it is unnecessary for the speech synthesis output apparatus 17 to sound the speech every time the base code is entered into the main computer body 15. The remaining keys of the slide keyboard apparatus 61 are provided according to the needs, but description on these remaining keys will be omitted since these remaining keys are unrelated to the subject matter of the present invention.

Figure 9:
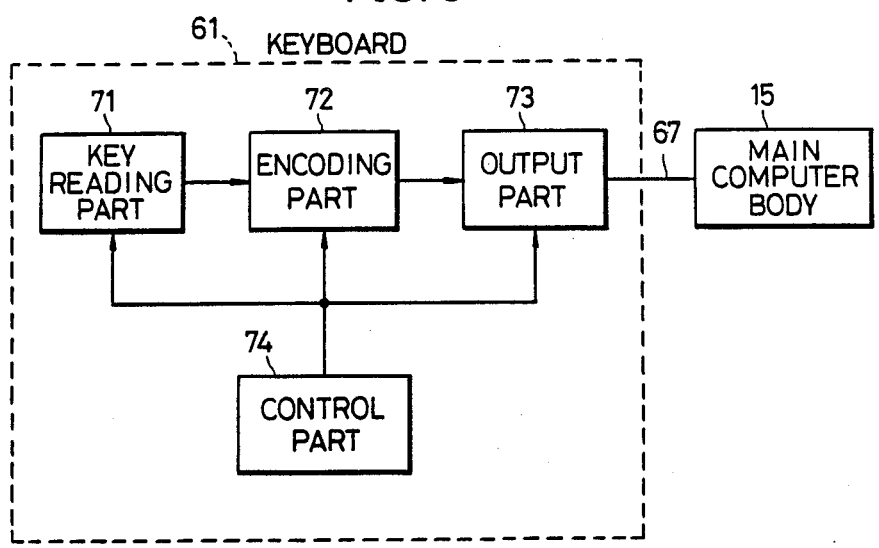
FIG. 9 is a functional system block diagram of the keyboard shown in FIG. 8.

A functional block diagram of the slide keyboard apparatus 61 is shown in FIG. 9. Functionally, the slide keyboard apparatus 61 comprises a key reading part 71 for reading the key input, an encoding part 72 for converting the key input which is read into a predetermined code, an output part 73 for supplying a code signal obtained from the encoding part 72 to the main computer body 15, and a control part 74 for controlling the operations of the key reading part 71, the encoding part 72, and the output part 73.

The main computer body 15 decodes the code signal received from the slide keyboard apparatus 61. In the case of the base code, the main computer body 15 controls the display apparatus 16 to display a letter corresponding to the base code at the cursor position on the display screen of the display apparatus 16, and controls the speech synthesis output apparatus 17 to sound the name of the base code. In the case where a code signal other than the base code is received from the slide keyboard apparatus 61, the main computer body 15 performs a processing operation in accordance with the code.

When entering the base code into the main computer body 15, the scale 64 of the slide keyboard apparatus 61 is put over the band 12 on the film 10 which is placed on the tracing board 60 in FIG. 7. Because the scale 64 is made from a magnifying glass, the operator can see the band 12 on an enlarged scale, and further, the operator can easily discriminate the up-down and right-left relationships of the band 12 by using the reference lines 65a and 65b. Accordingly, the operator pushes one of the keys 63a through 63d corresponding to the band 12 while watching the enlarged band 12 through the scale 64, so as to enter the base code corresponding to the band 12 into the main computer body 15. The operator moves the slide keyboard apparatus 61 from top to bottom, for example, and successively enters the base codes into the main computer body 15 while watching the bands in each row of bands on the film 10 through the scale 64. Since the slide keyboard apparatus 61 is of the lightweight handy type, the operation of sliding and moving the slide keyboard apparatus 61 is extremely simple.

In each of the embodiments described heretofore, the speech synthesis output apparatus 17 may be provided with a built-in switch having a moving contact and a pair of fixed contacts. In this case, the built-in switch of the speech synthesis output apparatus 17 is coupled to the main computer body 15. One of the fixed contacts of the built-in switch is coupled to the main body of the speech synthesis output apparatus 17, and the other of the fixed contacts of the built-in switch is coupled to the printer 19. In this case, the main body of the speech synthesis output apparatus 17 and the printer 19 are used selectively responsive to the switching of the built-in switch. The number of sockets required on the rear of the main computer body 15 in this case is two, that is, it is sufficient to provide a socket for coupling the main computer body 15 to the digitizer 11 or the slide keyboard apparatus 61 and a socket for coupling the main computer body 15 to the built-in switch of the speech synthesis output apparatus 17.

Further, the present invention is not limited to these embodiments, but various variations and modifications may be made without departing from the scope of the present invention.

What is claimed is:

1. An input apparatus for entering base sequence information of a gene from a film which has a plurality of sequences of bands imaged thereon in correspondence with the base sequence of the gene, said input apparatus comprising:
   a computer for analyzing the base sequence of the gene;
   digitizer means comprising pointing means for pointing out one band of said plurality of sequence of bands, and entering means for entering into said computer coordinate values of the one band which is pointed out by pointing means on the film;
   effective range setting means for entering into said computer coordinate values of points which surround an effective range for each of a plurality of kinds of bases, said computer comparing the coordinate values which are entered by said entering means and the coordinate values which are entered by said effective range setting means so as to convert the coordinate values which are entered by said entering means into a base code for representing one of said plurality of kinds of bases; and
   speech sounding means supplied with the base code from said computer for sounding speech corresponding to the base code supplied from said computer.

2. An input apparatus as claimed in claim 1 in which said computer supplies the base code to said speech sounding means every time a band is pointed out by said pointing means, and said speech sounding means sounds speech corresponding to the base code supplied from said computer every time the base code is supplied from said counter.

3. An input apparatus as claimed in claim 1 in which said computer successively stores the base codes and collectively supplies the stored base codes to said speech sounding means in sequence, and said speech sounding means collectively sounds speech corresponding to the base codes supplied from said computer in sequence.

4. An input apparatus as claimed in claim 1 in which said speech sounding means comprises a ready only memory which pre-stores speech data corresponding to said plurality of kinds of bases and produces a speech data corresponding to a base when applied with a base code corresponding to said base, a speech synthesizing large scale integrated circuit for converting the speech data produced from said read only memory into an analog audio signal, and means for sounding speech responsive to the analog audio signal from said speech synthesizing large scale integrated circuit.

* * * * *